United States Patent
Ramanathan et al.

(10) Patent No.: US 10,175,856 B2
(45) Date of Patent: Jan. 8, 2019

(54) DRAWER FOR DISPLAYING HIERARCHICAL DATA

(71) Applicant: Oracle International Corporation, Redwood Shores, CA (US)

(72) Inventors: Jairam Ramanathan, Waltham, MA (US); Prashant Singh, Lexington, MA (US); Yi Dai, Winchester, MA (US); Jindrich Dinga, Santa Clara, CA (US); David Kamholz, Westcliffe, CO (US)

(73) Assignee: Oracle International Corporation, Redwood Shores, CA (US)

(*) Notice: Subject to any disclaimer, the term of this patent is extended or adjusted under 35 U.S.C. 154(b) by 370 days.

(21) Appl. No.: 15/011,091

(22) Filed: Jan. 29, 2016

(65) Prior Publication Data

US 2016/0147393 A1 May 26, 2016

Related U.S. Application Data

(63) Continuation-in-part of application No. 14/604,429, filed on Jan. 23, 2015, now Pat. No. 9,939,991.

(60) Provisional application No. 62/017,214, filed on Jun. 25, 2014.

(51) Int. Cl.
| | | |
|---|---|---|
| G06F 3/048 | (2013.01) | |
| G06F 3/0482 | (2013.01) | |
| G06F 7/06 | (2006.01) | |
| G06F 3/0485 | (2013.01) | |
| G06F 3/0481 | (2013.01) | |
| G06F 17/30 | (2006.01) | |
| H04L 29/08 | (2006.01) | |

(52) U.S. Cl.
CPC ......... *G06F 3/0482* (2013.01); *G06F 3/0485* (2013.01); *G06F 3/04817* (2013.01); *G06F 7/06* (2013.01); *G06F 17/30554* (2013.01); *H04L 67/10* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 2005/0257169 A1* | 11/2005 | Tu | .......................... | G06F 3/0481 715/810 |
| 2006/0242121 A1* | 10/2006 | DeVorchik | ........ | G06F 17/30126 |

* cited by examiner

*Primary Examiner* — William C Trapanese
(74) *Attorney, Agent, or Firm* — Trellis IP Law Group, PC

(57) ABSTRACT

Implementations generally relate to the generation of tile visualization for interactively displaying data on a user device. In some implementations, a method includes retrieving hierarchical data from a data storage system, including one or more first data items and one or more second data items descended from at least one of the first data items. The method further includes generating for display a main window including at least a portion of the hierarchical data. The method further includes enabling a user to select one or more of the first data items or the second data items. The method further includes generating for display a drawer window upon activation of a drawer function. The method further includes causing the selected data items to be displayed in the drawer window.

20 Claims, 6 Drawing Sheets

500

510
Retrieve first through third hierarchical data items from data storage system.

520
Generate tile visualization including swim lane with first tile, active item location with second tile, and panel with third tile.

530
Forward tile visualization to device for display to a user.

540
Receive user input to activate the third tile.

550
Retrieve fourth data item, immediately descended from the third data item.

560
Update tile visualization: move second tile from active item location to swim lane; move third tile from panel to active item location; and include fourth tile in panel.

570
Forward updated tile visualization to device for display to a user.

Fig. 5

DRAWER FOR DISPLAYING HIERARCHICAL DATA

CROSS REFERENCES TO RELATED APPLICATIONS

This application is a continuation-in-part of the following application, U.S. patent application Ser. No. 14/604,429, entitled TILE VISUALIZATIONS FOR NAVIGATING HIERARCHICAL DATA ON MOBILE DEVICES, filed on Jan. 23, 2015, which claims priority from U.S. Provisional Patent Application Ser. No. 62/017,214, entitled METHODS FOR NAVIGATING HIERARCHICAL DATA ON MOBILE DEVICES, filed on Jun. 25, 2014, each of which are hereby incorporated by reference, as if set forth in full in this specification.

BACKGROUND

Implementations described herein relate to the field of user interfaces for visualizing, interacting with, and creating or modifying data in general, and in particular data organized into hierarchies.

There are many examples of large collections of data that have a hierarchical structure (for example, a company's employee organization chart). Prior applications for displaying hierarchical data typically require the larger desktop screens and precision of interaction afforded by a mouse to be used effectively. Because of these design factors, hierarchical data visualizations developed for desktop and laptop computers do not transfer well to mobile or other electronic devices with smaller screens.

SUMMARY

Implementations generally relate to the generation of tile visualization for interactively displaying data on a user device. In some implementations, a method includes retrieving hierarchical data from a data storage system, including one or more first data items and one or more second data items descended from at least one of the first data items. The method further includes generating for display a main window including at least a portion of the hierarchical data. The method further includes enabling a user to select one or more of the first data items or the second data items. The method further includes generating for display a drawer window upon activation of a drawer function. The method further includes causing the selected data items to be displayed in the drawer window.

A further understanding of the nature and the advantages of particular embodiments disclosed herein may be realized by reference of the remaining portions of the specification and the attached drawings.

BRIEF DESCRIPTION OF THE DRAWINGS

FIG. 5 illustrates a method of generating a tile visualization according to some implementations.

DESCRIPTION

Figure 1:
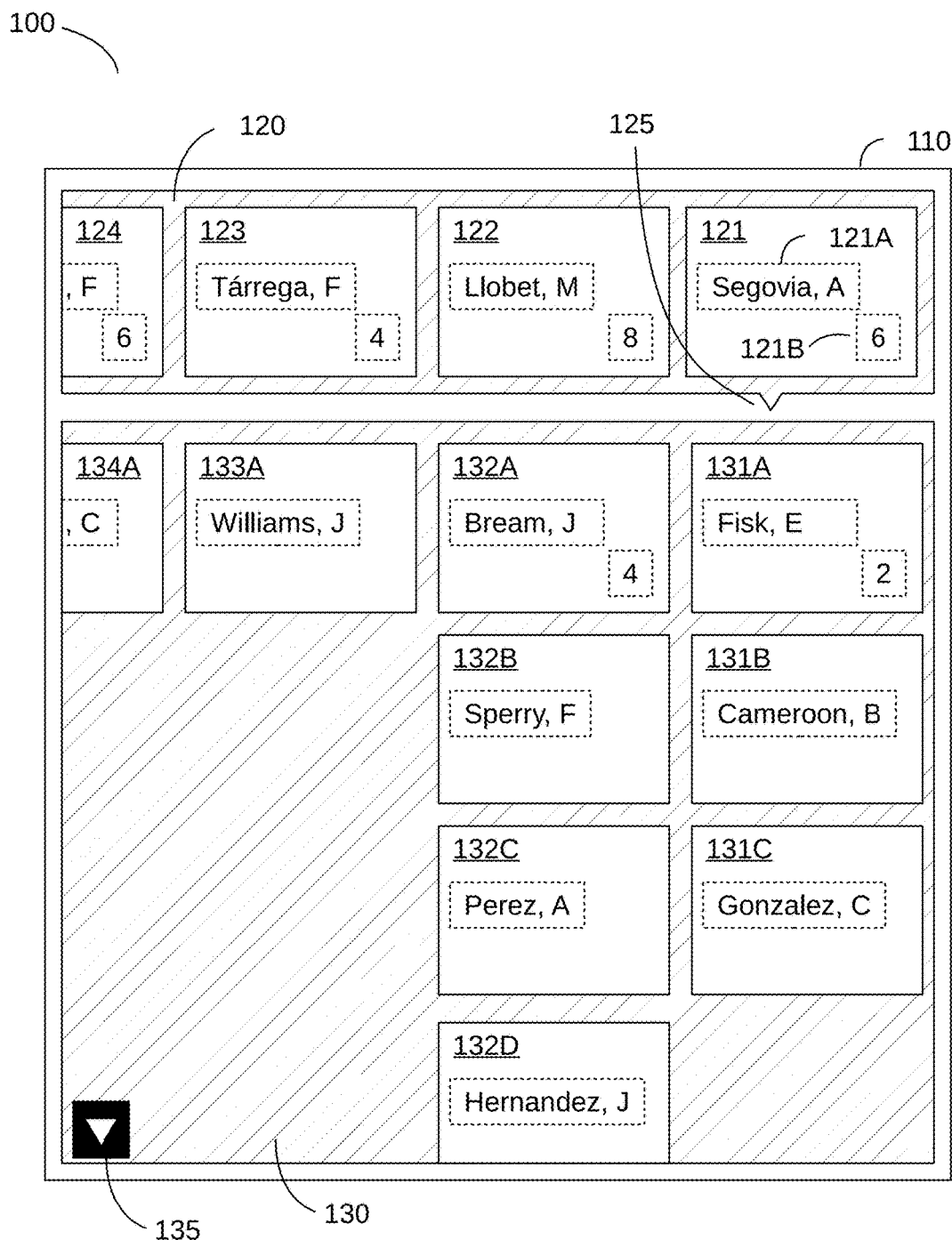
FIG. 1 illustrates a tile visualization according to some implementations.

Prior visualizations for hierarchical data typically require larger desktop screens to provide both overview and detail, and the precision of interaction afforded by a mouse to be used effectively.

Tile visualizations according to embodiments provide a way for a software application in a computing environment to present hierarchical data even on a small screen, such as available on a mobile device, while benefitting from easy user interactivity offered by the many user gesture inputs available on touchscreens. Embodiments may also support non-touchscreen devices by responding to traditional user inputs such as offered by mice and keyboards.

Tile visualizations according to implementations described herein provide a way to present hierarchical data on a wide variety of screen sizes, from large displays and desktop monitors down to handheld and mobile devices, while benefitting from easy user interactivity offered by the many user gesture inputs available on touchscreens. These tile visualizations provide both sufficient overview and sufficient detail. Embodiments of the tile visualizations partition the display area into a swim lane area and a panel area, and provide an active item location for an active data item in the hierarchical dataset. The swim lane area provides locations for ancestors of the active data item and the panel area provides locations for descendants of the active data item.

Various implementations include a method of generating a tile visualization for displaying hierarchical data, which includes the steps of retrieving hierarchically related data items from a storage system, generating a visualization window with a swim lane area, a panel area and providing an active item location, generating an active tile representing an active data item to be displayed in the active item location, generating a tile representing a descendant (e.g., a child) data item to be displayed in the panel area, and a tile representing an ancestor (e.g., a parent) data item to be displayed in the swim lane area, and forwarding the generated window and tiles to a user device for display. Embodiments may include a visual indicator to identify the active tile or its location.

Embodiments may display a chain of hierarchical ancestors in a row or column in the swim lane, and additional descendants in the panel. Tiles in the panel may be arranged to show further levels of hierarchy. If the number of tiles in the swim lane or panel is larger than can be displayed simultaneously, the area may be scrollable.

Some implementations may allow for hierarchical navigation by activating a non-active tile in the swim lane (upward navigation) or in the panel (downward navigation). The new active tile moves to the active item location, replacing the former active tile. Upon activation, these embodiments determine a first subset of the hierarchical data, including data items that are ancestors of the new active tile, and a second subset, including data items that are descendants of the new active tile. Embodiments generate new ancestor tiles for display in the swim lane and new descendant tiles for display in the panel, replacing tiles that were previously displayed.

Further embodiments may allow users to select tiles without activating these tiles. Yet further embodiments may offer a drawer function that can display the currently selected data items outside of their hierarchical relationships and that allows a user to interact with one or more of the currently selected data items in a drawer window. The drawer window is described in more detail below. In various implementations, the drawer function may allow the user to interact with a single, multiple, or all of the currently selected items.

FIG. 1 illustrates a tile visualization 100 according to some implementations. The visualization 100 is enclosed by a component container border 110. The visualization 100 includes an area 120 referred to as a "swim lane," and an area 130 referred to as a "panel." The tile visualization displays tiles representing hierarchically related data items from a hierarchical dataset. Hierarchical relations may be "immediate," e.g., where the hierarchical levels of two data items differ by one (1). In such a case, the data item with the higher hierarchical level may be called the "parent" or "immediate ancestor" and the data item with the lower hierarchical level may be called the "child" or "immediate descendant." Hierarchical relations may be "remote," e.g., where the hierarchical levels of two data items differ by two or more. In such a case, the data item with the higher hierarchical level may be called the "remote ancestor" (such as a "grandparent") and the data item with the lower hierarchical level may be called the "remote descendant" (such as a "grandchild").

One tile, an "active tile" representing an "active data item," may be positioned in an "active item location," which may be anywhere in the visualization, e.g., fully or partially inside or outside the swim lane and/or the panel. In some embodiments, the active item location may be situated inside the swim lane. Hierarchical ancestors of the active tile are displayed in the swim lane. Hierarchical descendants of the active tile are displayed in the panel.

The swim lane 120 is depicted in FIG. 1 as a container with a linear arrangement of tiles 121-124. The linear arrangement of tiles in the swim lane 120 may include a row or a column. Some embodiments may display the swim lane 120 horizontally, for instance at the top or at the bottom of the visualization 100, or vertically, for instance at the left hand or right hand side of the visualization 100.

Embodiments may visually style the tiles 121-124 as cards, for example, or other types of graphical icons or entities, with each tile representing one or more data items in the hierarchical dataset. In the embodiment illustrated in FIG. 1, each tile represents a single data item. A tile, here displayed in the swim lane, may be active (e.g., shown in the active item location). In this embodiment, the rightmost tile 121 is the active tile. The active tile, or the active item location, may be highlighted, color coded or otherwise visually marked. In FIG. 1, the active item location is indicated by marker arrow 125 pointing from tile 121 in the active item location to panel 130.

Tiles 122-124, positioned to the left of tile 121, represent its hierarchical ancestors, e.g., the data items that are parents or higher ancestors of the active data item in the hierarchical dataset. For example, tile 122 represents the hierarchical parent of tile 121. In turn, tile 123 represents the hierarchical parent of tile 122, and so on. Tile 124 is partially displayed, which identifies swim lane 120 as currently scrollable, in this case in the horizontal direction. This indicates that there may be additional hierarchical ancestors associated with the active data item. While tile 124 may represent the top of the hierarchy, further ancestors may be available. Embodiments will show the tile representing the top of the hierarchy upon receiving (sufficient) user scroll inputs, such as horizontal swipes. Embodiments may utilize partially displayed tiles, stacked tiles, or other means such as scroll controls or indicators, to identify swim lane 120 or panel 130 as scrollable.

Should a user scroll input impact the position of the active item location, then embodiments may move any indicators of the active item location, such as marker arrow 125, along with the active item location. Further embodiments may allow the active item location to be scrolled out of view, along with any of its indicators such as marker arrow 125. Yet further embodiments may, when the active item location scrolls out of view, de-emphasize the panel area and any objects in it, for example by decreasing its contrast or the saturation level of its colors.

Alternatively, embodiments may not allow the active item location to be scrolled out of view. For example, if the active item location is included in the swim lane, scrolling the swim lane may result in the active item location being lodged against one extreme of the swim lane, so that the active tile remains visible. Embodiments may allow scrolling its ancestors, and those tiles hierarchically closest to the active tile that are no longer visible may, for example, be stacked under the active tile. In other embodiments, those tiles hierarchically closest to the active tile may, for example, be stacked on top of the active tile. In such a case, marker arrow 125 may disappear, and those embodiments may de-emphasize the panel area and any objects in it, for example by decreasing its contrast or the saturation level of its colors.

Embodiments may reverse the order of the tiles 121-124 in the swim lane 120, and show the active tile 121 as the leftmost tile. Similarly, in vertical embodiments, active tile 121 may be displayed as the topmost tile, or as the bottommost tile.

Tiles may display various properties contained in the data items they represent. Tile 121 includes a name label 121A representing a name of its represented data item. It also includes an indicator 121B showing the number of immediate hierarchical descendants, in this case six. In embodiments, indicator 121B could show other or additional information, such as the total number of descendants. Tiles may include shapes, text labels, hypertexts, icons, images, context popups, callouts, buttons, and any other controls commonly used in graphical user interfaces. Embodiments could visualize a tile or a control within a tile with color coding, hashing, texture, shading, highlighting, or changing contrast to reveal underlying data item information, or to reflect user interaction or customization.

Panel 130 displays one or more levels of descendants of the active tile 121. If an embodiment displays one level, all tiles in the panel represent hierarchical peers, and they may be displayed in any convenient arrangement, for example in an array. In that case, ordering in the array may be based on some property contained in the data items, such as seniority, date of birth, and so on. FIG. 1 illustrates an example implementation of a panel 130 with two levels of descendants of tile 121. Immediate descendants 131A-134A, of which tile 121 represents the hierarchical parent, are shown in the top row, each heading a column of their own descendants, e.g., remote descendants of active tile 121. This embodiment shows tile 134A partially, indicating that more immediate descendants may be available. Since indicator 121B shows that in this example tile 121 has six immediate descendants, two more immediate descendants may become visible upon user left scroll interaction on any of the tiles in panel 130 or of panel 130 itself. In response to receiving a horizontal scroll input on (any of the tiles in) panel 130, this embodiment may horizontally shift all panel 130 tiles in unison to maintain its hierarchical order.

Embodiments may visually distinguish between immediate descendants 131A-134A and remote descendants 131B-C, 132B-D, for instance by color coding tiles or any of the objects contained in the tiles, by using different fonts or font effects, hashing, texture, shading, highlighting, or by changing contrast.

Tiles 131B-C represent the immediate descendants of tile 131A, and tiles 132B-D represent three of four immediate descendants of tile 132A. The embodiment displays tile 132D partially, indicating that this column is vertically scrollable. Upon receiving a user vertical down scroll input, it will scroll column 132A-D vertically and display the fourth immediate descendant of tile 132A. Embodiments may allow scrolling remote descendants 132B-D while leaving immediate descendants 131A-134A in place. Some embodiments may scroll the columns in unison, whereas other embodiments will scroll only the column for which a user scroll input is received.

Horizontal and vertical embodiments may place tiles for immediate descendants in a row with remote descendants in respective columns, such as illustrated in FIG. 1, or in a column (not shown). In a vertical embodiment immediate descendants could be displayed in a column directly adjacent to the swim lane, with remote descendants in respective rows.

In a further embodiment, each of the tiles for remote descendants may be grouped with further tiles or indicators representing data items at even lower hierarchy levels.

Embodiments may allow for navigation within the hierarchy in several ways, dependent on the available types of user interaction. For instance, if the display includes a touchscreen, tapping a tile in the swim lane 120 may activate it. In response to receiving a user swim lane 120 tap input on a tile other than the currently active tile 121, for instance on tile 123, the embodiment may activate the tapped tile 123, move it to the active item location, and remove hierarchically lower tiles 121-122 from the swim lane 120. Tile 123 now becomes, for instance, the rightmost displayed tile and the active tile. If there are not sufficient tiles of immediate ancestors for tile 123 to display it all the way to the right, marker arrow 125 may move to align correctly and point from tile 123 to panel 130. The embodiment removes descendants of tile 121 from the panel and instead displays tiles for the four immediate descendants of tile 123, which may include tile 122, and descendants from the next level, which may include tile 121.

Generally, tapping, or mouse double-clicking, or otherwise activating an item in the swim lane 120 allows for navigation towards higher levels in the hierarchy. Likewise, tapping, mouse double-clicking, or otherwise activating an item in the panel 130 allows for navigation towards lower levels in the hierarchy. For instance, in some implementations, as illustrated in FIG. 1, tapping tile 131A will lead to moving tile 131A from the panel to the swim lane, and positioning tile 131A to the right of tile 121. Tiles 121-123 shift to the left to make room for tile 131A. Tile 124 shifts out of the visible part of the swim lane, but could be shown again upon scrolling. Tiles 132A-D, 133A and 134A are removed from panel 120. Tiles 131B and 131C move to the top row of the panel and are displayed side by side. Since neither tile 131B nor tile 131C has descendants, no further tiles are displayed in the panel.

Embodiments may provide for further ways of navigation, such as the user dragging a tile from the swim lane to the panel, thereby activating its parent tile, or activating a tile by dragging it from the panel to the swim lane or active item location.

Embodiments may allow users to select one or more tiles without activating them. This can be achieved through any available user interaction, including for instance long-pressing a tile on a touchscreen, or single-clicking with a mouse. Deselecting a tile could be achieved, for instance, by repeating the same interaction, and deselecting all tiles could be achieved, for instance, by tapping or clicking an unoccupied area of the panel, or by tapping or clicking the active tile. Tile selection allows a user further interaction with the data item represented by the tile. This allows for adding, removing or modifying data contained in the data item, moving or removing the data item altogether, or generally any user interaction that is performed on hierarchical data.

Further embodiments may select tiles without activating them through the use of a filter function. For example, tiles may be selected on the basis of a data item property, or combination of properties, in response to a user applying a selection filter.

In various implementations, the system causes a drawer activation control to be displayed for activating the drawer function in response to the user selecting the one or more first data items or second data items In various implementations, the system causes a drawer activation control 135, or indicator 135, to be displayed in response to a user selecting one or more data items (e.g., has selected one or more tiles in the swim lane area or panel area, etc.). As shown in FIG. 1, drawer activation control 135 is positioned in the lower left-hand portion of panel area 130 of a main window. In various implementations, drawer activation control 135 may be positioned anywhere in the main window. In further embodiments, drawer activation control 135 may be a drawer activation control that allows activation of a drawer function. The drawer function is described in more detail herein.

Figure 2:
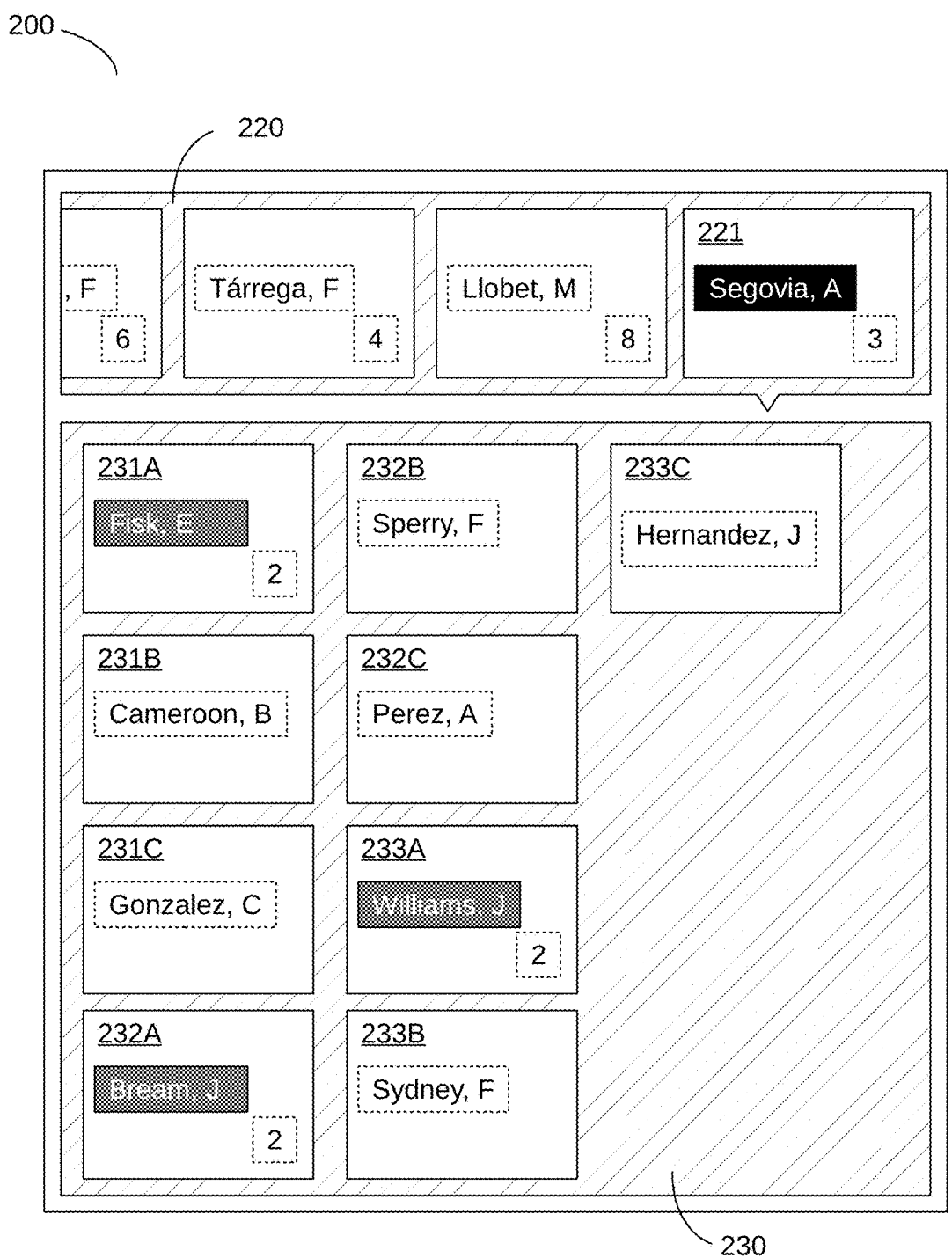
FIG. 2 illustrates a tile visualization with panel tiles arranged in columns according to some implementations.

FIG. 2 illustrates a tile visualization 200 with panel 230 tiles arranged in columns according to some implementations. Visualization 200 includes swim lane 220 and panel 230. The swim lane 220 includes the active item location and active tile 221, which in this example is styled visually distinct from other tiles.

Panel 230 may include immediate descendants that are styled differently than remote descendants. The panel 230 may include multiple columns of tiles. This embodiment locates immediate descendant 231A of active tile 221 in, for instance, a first column starting at panel 230's top left corner, with its two descendants 231B and 231C underneath it. They are followed by the next available immediate descendant of active tile 221. Tile 232A is visually styled like tile 231A and therefore a peer, and also an immediate descendant of active tile 221. Tile 232A's descendants 232B-C cannot be located underneath tile 232A, since tile 232A happens to be located at the bottom of the panel. Therefore they are lined up in the second column of panel area tiles. Again, they are followed by the next immediate descendant, tile 233A. Its descendant 233B is shown at the bottom of the second column, and its descendant 233C is shown at the top of the third column.

Distinct styling of immediate versus remote descendants allows for available columns to be filled completely, as long as more immediate and/or remote descendants are available. The multiple columns in panel 230 in this embodiment could be interpreted as a single column that may be fully or partially broken up in a few sub-columns, placed successively next to each other. Embodiments may allow for vertical scrolling of the panel if there are more tiles representing immediate and/or remote descendants than locations in the sub-columns. Scrolling would allow, for instance, for additional tiles to become visible at the bottom of the last sub-column, with the already visible tiles snaking up towards the leftmost top position, where the first immediate descendant 231A will first scroll out of view, followed by its descendants 231B and C, and so on. Embodiments may scroll the panel area in this fashion upon receiving an associated user scroll input, such as a vertical swipe of any of the tiles shown in the panel.

Embodiments may arrange the panel tiles in columns as shown in FIG. 2, or, for example, in rows. In the latter case, a horizontal swipe input could control scrolling of the tiles in the panel area.

Figure 3:
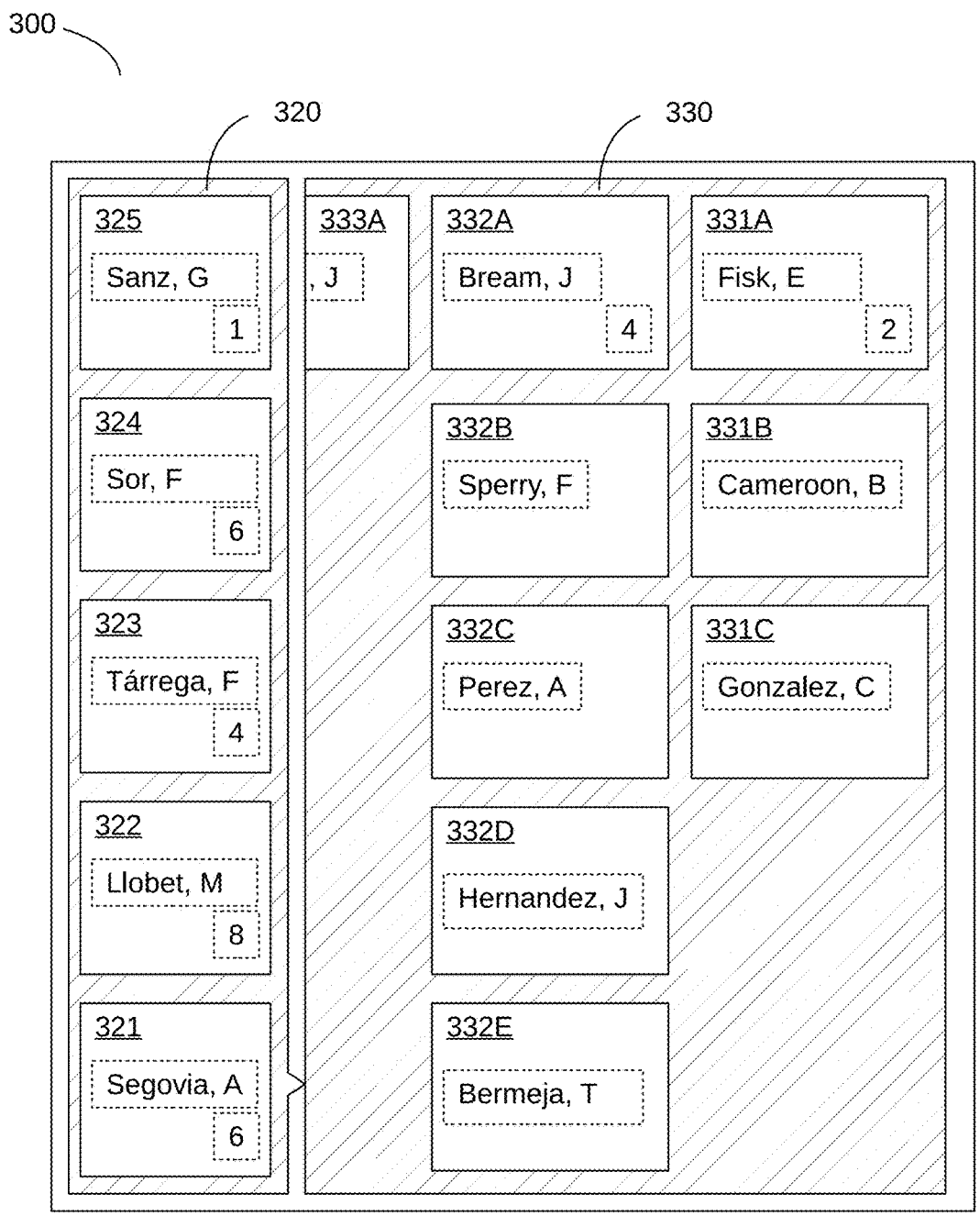
FIG. 3 illustrates a vertical tile visualization according to some implementations.

FIG. 3 illustrates a vertical tile visualization 300 according to some implementations. The visualization 300 includes swim lane 320, positioned as a column with active tile 321 and ancestor tiles 322-325 on the left hand side, and panel 330 with immediate descendants 331A-333A and remote descendants 331B-C and 332B-E. In this example vertical embodiment, the immediate descendants 331A-333A have been placed in the top row of panel 330, and the remote descendants 331B-C and 332B-E have been placed in columns headed by their respective parents.

Embodiments may determine the number of simultaneously visible tiles as a function of the screen size and orientation. For instance, a tablet computer could display more rows and columns of tiles than a smartphone. Either a smartphone or a tablet computer connected with a monitor or television screen could display yet more rows and/or columns. Further embodiments of the above-described visualizations may responsively or dynamically resize and arrange icons to accommodate the size and orientation of the available display screen. Yet further embodiments may change the orientation of the swim lane and/or array of tiles in the panel in response to a change in orientation. For example, a screen held horizontally may show a horizontal swim lane and/or row of immediate descendants. When the user changes the screen orientation and holds it vertically, the orientation of the swim lane and/or immediate descendants may become vertical too.

As described in various implementations herein, the system retrieves hierarchical data from a data storage system, including one or more first data items and one or more second data items descended from at least one of the first data items. In various implementations, the system may be implemented using system 600 of FIG. 6, which is described in more detail below, or the may be implemented with any other suitable system.

Referring again FIGS. 1, 2, and 3, the first data items may be represented as tiles in swim lane areas 120, 220, and 330, and the second data items may be represented as tiles in panel areas 130, 230, and 330. Furthermore, the system generates for display a main window that includes at least a portion of the hierarchical data (e.g., any of tile visualizations 100, 200, 300, or other hierarchical data scheme, etc.). The system also enables a user to select one or more of the first data items or the second data items (e.g., select one or more tiles in a given tile visualization). As described in more detail herein, in various implementations, the system provides drawer functionality in order to facilitate a user in navigating a hierarchical data scheme and/or take various actions associated with data items in the hierarchical data scheme.

Figure 4:
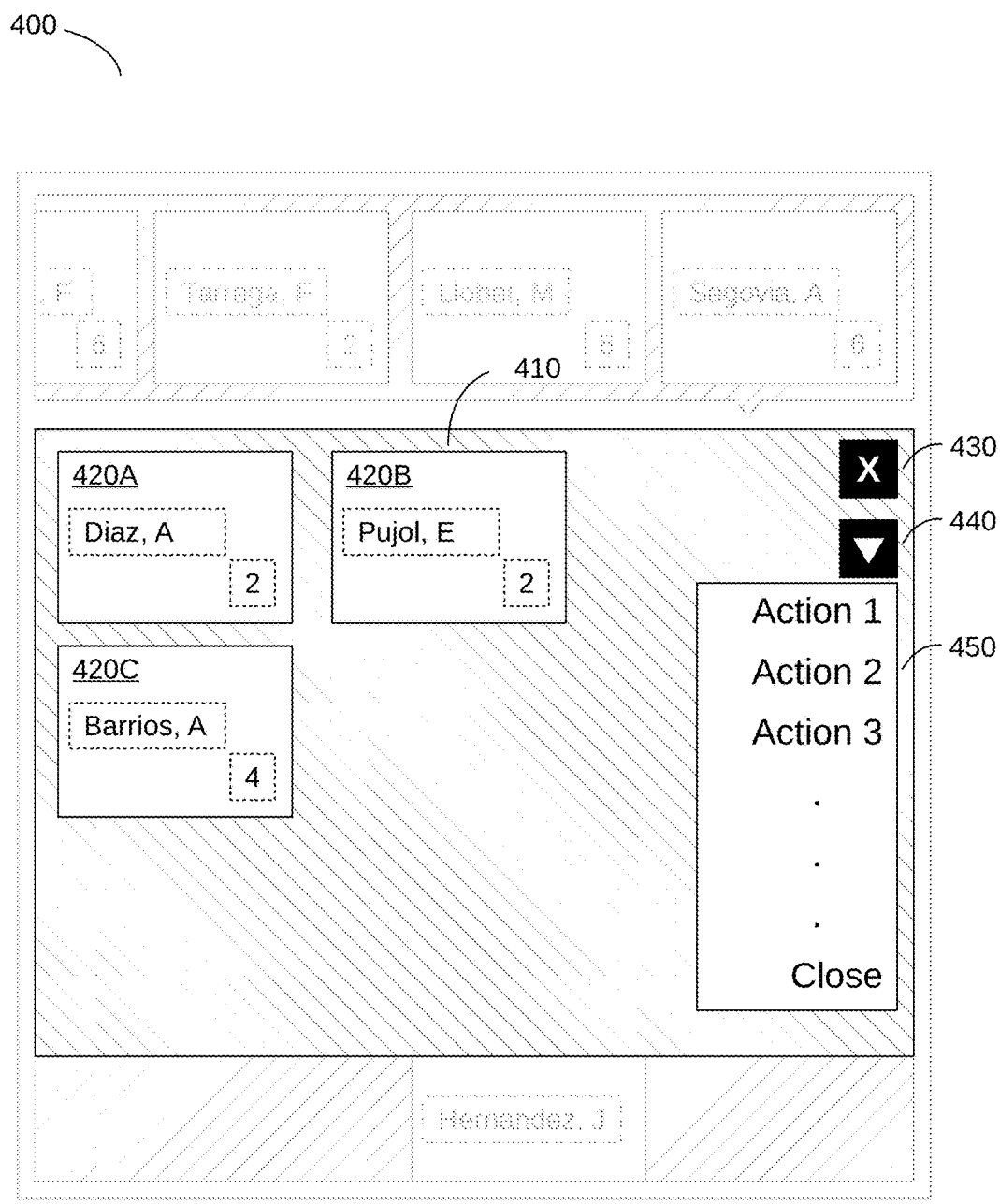
FIG. 4 illustrates drawer functionality according to some implementations.

FIG. 4 illustrates drawer functionality 400 according to some implementations. As described in more detail below, in various implementations, drawer functionality 400 of the system causes a drawer window 410, or window 410 to be displayed, upon activation of drawer functionality 400. The drawer functionality 400 also causes the selected data items to be displayed in the drawer window.

In some implementations, if window 410 is smaller than the main visualization window, or main window, embodiments may visually de-emphasize the main window, for example by decreasing its contrast of the colors of the main window, and/or by decreasing the saturation levels of the colors of the main window, and/or by partially masking or fading out the main window, and/or by displaying the drawer window in front of the main window.

In various implementations, drawer functionality 400 enables a user to select tiles from a tile visualization described such as the example implementations described herein (e.g., FIGS. 1, 2, 3, etc.), or enable a user to select tiles from any other suitable hierarchical data model or scheme. Upon selection of one or more tiles, drawer functionality 400 associates or adds such selected tiles to drawer window 410.

In various implementations, drawer window 410 displays the currently selected tiles, such as tiles 420A-C. In various implementations, the selected data items or tiles may be displayed and arranged independent of their hierarchical relationships. For example, in various implementations, drawer functionality 400 may associate one or more different tiles from multiple different locations of a hierarchical data model or scheme with drawer window 410. For example, the different tiles 420A-C in drawer window 410 may be from different locations in a hierarchical relationship.

In some implementations, tiles 420A-C may be positioned in any arrangement, without a particular order. For example, in some implementations, the selected data items (e.g., tiles 420A-C) may be displayed and arranged with an order based on a sub-hierarchy. In some implementations, tiles 420A-C may be arranged based on any other property of the underlying data items (e.g., a thematic map, etc.). In some implementations, if there are more tiles than can be shown simultaneously, the drawer window 410 may be scrollable and/or tiles may be stacked to indicate their presence. Drawer window 410 may include a window control 430 to hide drawer window 410 or close drawer window 410.

In some implementations, the system may cause a menu launcher control 440 to be displayed, where menu launcher control 440 operates to launch menu 450. Example implementations of launch menu 450, or menu 450, are described in more detail below. Embodiments may leave out controls 430 and 440 when other methods exist to control drawer window functionality and/or to launch menu 450, such as physical device buttons that are not part of the display.

In various implementations, the drawer function may allow the user to interact with a single, multiple, or all of the currently selected data items. In various implementations, drawer function 400 enables one or more single and/or collective actions on tiles. In some implementations, menu 450 includes a list of available actions (e.g., "Action 1," "Action 2," "Action 3," etc.) that may be performed on the data items or tiles in drawer window 410. In some implementations, each action is associated with interaction with the data items represented by selected tiles 420A-C, and it may also include actions affecting the window function (for example, "Close"). The list may be plain, or hierarchical through the use of submenus. An action selected from the menu 450 may affect all selected data items or tiles (e.g., all tiles in the drawer, etc.). In various implementations, drawer function 400 provides context-specific actions based on the current set of items (e.g., tiles 420A-C, etc.) within drawer window 410. Example actions on tiles include a compare function (e.g., "Compare"), a promote function (e.g., "Promote"), a demote function (e.g., "Demote"), a delete function (e.g., "Delete"), a new common ancestor function (e.g., "New common ancestor"), and a property modify function (e.g., "Modify a property"), and generally any user interaction that may be performed on hierarchical data items.

Embodiments described herein may make the content of the drawer persistent. For example, upon reopening drawer window 410, it will include the same tiles as the last time drawer window 410 was closed.

In various implementations, drawer function 400 provides a data book marking function. In some implementations, the data book marking function enables navigation back to particular tiles in a hierarchical data model or scheme. For example, the data book marking function may enable a user to navigate back to particular tiles in hierarchical data model such as a tile visualization. For example, drawer function 400 may enable the user to navigate a tile visualization (e.g., as shown in FIGS. 1, 2, 3, etc.), or any other suitable hierarchical data model or scheme). Drawer function 400 may also enable the user to select one or more tiles (e.g., 5 different tiles) as described herein, where drawer function 400 associates and adds and display the selected tiles to drawer window 410. Drawer function 400 enables the user to navigate across the tiles or nodes of the hierarchy view drawer window 410. In various implementations, the tiles shown in drawer function 400 enables the user to jump to or snap back to any one or more of the selected tiles at their location within the hierarchy.

FIG. 5 illustrates a method 500 of generating a tile visualization for interactively displaying hierarchical data on a user device in a computing environment, the computing environment including a software application, a user device screen, and a system for receiving user inputs, according to some implementations.

Although the steps, operations, or computations may be presented herein in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein. In various implementations, the method may include the following steps.

In block 510, the system retrieves a set of hierarchical data items from a database or other data storage system. Data items may include hierarchical information as well as other properties. In response to a query specified by a user or a software application, and based on associated filter criteria, the system retrieves one or more first data items, a second data items descended from at least one of the first data items. In other words, the first data items have a hierarchical parent relation to the second data items. In some implementations, one or more third data items are retrieved, where the second data items have a hierarchical parent relation to the third data items. Further embodiments may retrieve any number of data items having hierarchical relations with the second data items.

In block 520, the system generates for display a tile visualization with a swim lane area, an active item location, and a panel area. In various implementations, the system generates for display a main window, where the main window includes at least a portion of the hierarchical data.

In various implementations, the swim lane area, the active item location, and the panel area are displayed in the main window. In some embodiments, the swim lane and panel areas do not overlap. In further embodiments, the swim lane may be a horizontal rectangle aligned and adjacent with the top or the bottom of the visualization window, or a vertical rectangle aligned and adjacent with the left or right side of the visualization window. In yet further embodiments, the swim lane may fully or partially include the active item location. And in some embodiments, the panel may fully or partially include the active item location.

The active item location provides a location for a tile representing the second data item (the "active" data item). The swim lane provides locations for tiles representing data items with a hierarchical ancestor relation to the active data item. In embodiments, the swim lane may be scrollable such that representations can be viewed of additional ancestors in a direct chain to the active data item.

In embodiments, the panel may be directly adjacent to the swim lane, or adjacent to but separated from the swim lane by a distance. The panel provides locations for tiles representing data items with a hierarchical descendant relation to the active data item. In some embodiments, the panel may be scrollable, such that representations can be viewed for additional descendants of the active data item.

In some embodiments, the tile visualization and its components may include descriptive code that is independent of an operating system and suitable for display on an Internet-connected device, such as HTML, which may be enhanced by, for example, CSS to define visualization themes, and by scripts supporting interactivity, such as JavaScript. In other embodiments, the tile visualization and its components may include computer code targeted at a single or limited number of operating systems.

As described in more detail herein, the system enables a user to select one or more of the first data items and/or the second data items. The system generates for display a drawer window upon activation of a drawer function, and the system causes the selected data items to be displayed in the drawer window.

In block 520, the system generates for display in the swim lane a first tile representing the first data item, generating for display in the active item location a second tile representing the second data item, and generating for display in the panel a third tile representing the third data item. Tiles may include shapes, text labels, hypertexts, icons, images, context pop-ups, callouts, buttons, and any other controls commonly used in graphical user interfaces. Tiles may display properties included in the represented data items. Further embodiments may generate any number of additional tiles to represent additional data items that include hierarchical relationships with the second data item.

In block 530, the system forwards the tile visualization to a device for display to a user. The device may include a large screen, such as a monitor employed in a sports stadium, or a small screen, such as on a watch-styled wearable device, or any other size screen. The device may include, for example, a television monitor, desktop monitor, notebook computer, tablet, or a mobile phone.

In block 540, the system receives a user input to activate the third tile. For instance, if the device display includes a touchscreen, tapping the third tile may activate it. If the device display does not include a touchscreen, double-clicking the third tile with a mouse may activate it. In general, any commonly used user input event may be used to activate a tile.

In block 550, in response to receiving the user input to activate the third tile, the system retrieves a fourth data item from the data storage system, wherein the fourth data item is immediately descended from the third data item (e.g., the fourth data item is a child of the third data item) or remotely descended from the third data item (e.g., the fourth data item is a grandchild or further descendant of the third data item). Embodiments may retrieve additional data items that are immediately or remotely descended from the third data item. Some particular embodiments may only retrieve the fourth or additional item if it is a child of the third data item. Other embodiments may also, or instead, retrieve data items that are descendants of the third data item at one or more lower hierarchical levels.

Upon activating a (tile representing a) data item, embodiments determine two subsets of the hierarchical data. The first hierarchical data subset includes data items (if any) that are hierarchical ancestors of the active data item. The second hierarchical data subset includes data items (if any) that are hierarchical descendants of the active data item. Some embodiments may filter on additional data item properties to select members of the first and second hierarchical data subsets. Such data item properties may be determined by the user or by the application. Further embodiments may filter on the basis of a user's authorized level to access some or all of the data items and/or data item properties.

In block 560, still in response to receiving the user input to activate the third tile, system updates the tile visualization for display, including updating the panel to remove the third tile and to include a fourth tile representing the fourth data item, updating the active item location to remove the second tile and to include the third tile, and updating the swim lane to include the second tile.

Embodiments represent data items from the first hierarchical data subset (if any) by tiles displayed in hierarchical order in the swim lane, and data items from the second hierarchical data subset (if any) by tiles displayed in the panel. Further embodiments may limit the number of hierarchical levels displayed in the panel, and may arrange tiles according to a sub-hierarchy. For instance, immediate descendants of the active tile may be arranged in a single row, with their respective descendants in columns underneath or above. Alternatively, immediate descendants of the active tile may be arranged in a single column, with their respective descendants in rows to the right or left.

In block 570, still in response to receiving the user input to activate the third tile, the system forwards the updated tile visualization to the device for display to the user.

Further embodiments may receive from the device a user input to scroll tiles in the swim lane, and in response move all tiles in the swim lane to show parts of the first or third hierarchical data subset that were previously not visible.

Yet further embodiments may receive from the device a user input to scroll tiles in the panel, and in response move part or all tiles in the panel to show parts of the second or fourth hierarchical data subset that were previously not visible.

Embodiments may respond to changes in user device screen orientation, for instance they may change an orientation of the swim lane or of the panel, or they may change a number of simultaneously displayed tiles.

Embodiments may provide a drawer function, by generating a drawer window for display on the device, and displaying tiles for selected or otherwise queried or filtered data items, and allowing user interaction on the displayed tiles.

Implementations provide various benefits. For example, implementations provide drawer functionality that facilitate a user in navigating a hierarchical data scheme and/or take various actions associated with data items in the hierarchical data scheme.

Furthermore, implementations transfer well to mobile or other electronic devices with smaller screens, less precise input devices, and fundamentally different basic operating characteristics, such as finger touch and gesture-based interfaces. Implementations also maintain easy and accurate user interaction and the capability to provide both sufficient overview and sufficient detail.

Figure 6:
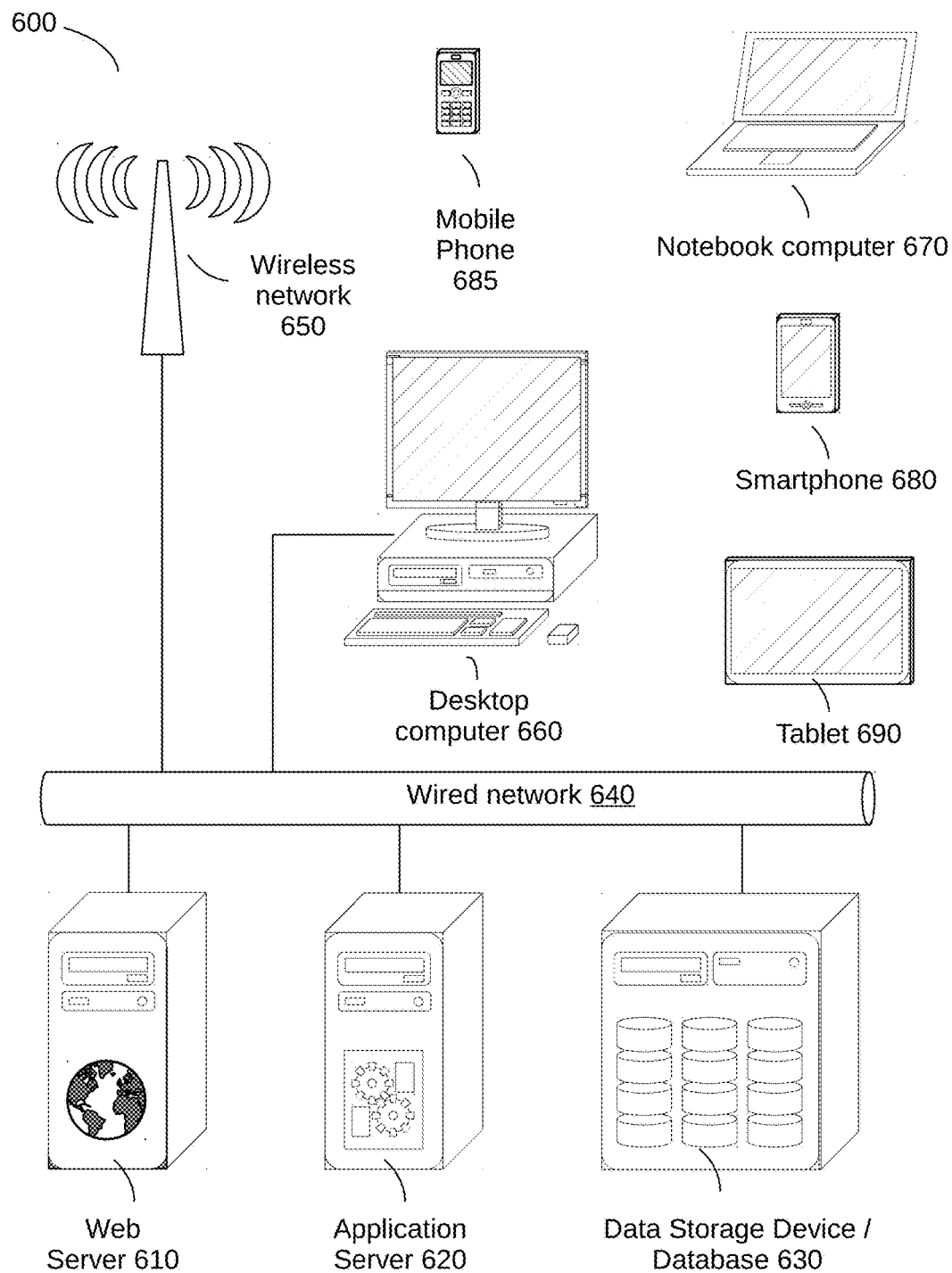
FIG. 6 illustrates an example system capable of generating and displaying tile visualizations according to some implementations.

FIG. 6 illustrates an example system 600 capable of generating and displaying tile visualizations according to some implementations. Embodiments may be implemented as standalone applications or as web-based applications implemented using a combination of client-side and server-side code. The system includes user computers 660-690 including desktop 660 and portable personal computers 670, smart-phones 680, mobile phones 685, and tablets 690. The system can interface with any type of electronic device, such as a thin-client computer, Internet-enabled mobile telephone, mobile Internet access device, tablet, electronic book, or personal digital assistant, capable of displaying and navigating web pages or other types of electronic documents and/or executing applications. Although the system 600 is shown with five user computers, any number of user computers can be supported.

A web server 610 is used to process requests from web browsers and standalone applications for web pages, electronic documents, enterprise data or other content, and other data from the user computers. The server may also provide push data or syndicated content, such as RSS feeds, of data related to enterprise operations.

Application server 620 operates one or more applications. The applications can be implemented as one or more scripts or programs written in any programming language, such as Java, C, C++, C#, or any scripting language, such as JavaScript or ECMAScript, Perl, PHP, Python, Ruby, or TCL. Applications can be built using libraries or application frameworks, such as Rails, Enterprise JavaBeans, or .NET. Web content can created using HTML, CSS, and other web technology, including templating languages and parsers.

The data applications on application server 620 process input data and user computer requests and can store or retrieve data from database 630. Database 630 stores data created and used by the data applications. In an embodiment, the database 630 is a relational database that is adapted to store, update, and retrieve data in response to SQL format commands or other database query languages. In other embodiments, unstructured data storage architectures and NoSQL databases may also be used.

In an embodiment, the application server 620 is one or more general-purpose computers capable of executing programs or scripts. In an embodiment, the web server 510 is implemented as an application running on one or more general-purpose computers. The web server and application server may be combined and executed on the same computers.

An electronic communication network 640-650 enables communication between user computers 660-690, web server 610, application server 620, and database 630. In an embodiment, network 640-650 may further include any form of electrical or optical communication devices, including wired 640 and wireless 650 networks. Network 640-650 may also incorporate one or more local-area networks, such as an Ethernet network; wide-area networks, such as the Internet and cellular carrier data networks; and virtual networks, such as a virtual private network.

The system is one example for executing applications according to an embodiment. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Concepts illustrated in the examples may be applied to other examples and implementations.

Any suitable programming language can be used to implement the routines of particular embodiments. Any type of programming techniques may be employed including procedural, functional, and/or object oriented programming techniques. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions (e.g., program or software instructions) for execution by the processor.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of generating a tile visualization for interactively displaying data on a user device in a computing environment, the computing environment including a processor, a software application, a user device screen, and a system for receiving user inputs, the method comprising:
    retrieving hierarchical data from a data storage system, including one or more first data items and one or more second data items descended from at least one of the first data items;
    generating for display a main window including at least a portion of the hierarchical data presented as a linear arrangement of icons in a container window disposed within the main window, wherein the container window includes a marker arrow pointing from an item located in an active item location of the container window to a panel portion of the main window containing descendants of the item;
    enabling a user to select one or more of the first data items or the second data items;
    generating for display a drawer window upon activation of a drawer function;
    configuring the drawer window to visually emphasize selected data items outside of their hierarchical relationships;
    configuring the main window to visually de-emphasize visible non-selected data items and windows disposed within the main window and disposed outside the drawer window; and
    causing the selected data items to be displayed in the drawer window.

2. The method of claim 1, further comprising:
    causing a drawer activation control to be displayed for activating the drawer function in response to the user selecting the one or more first data items or second data items; and
    activating the drawer function in response to the user selecting the drawer activation control.

3. The method of claim 1, wherein the selected data items are displayed independent of their hierarchical relationships.

4. The method of claim 1, wherein the selected data items are displayed based on a sub-hierarchy.

5. The method of claim 1, further comprising causing a menu launcher control to be displayed for launching a menu.

6. The method of claim 1, further comprising causing a menu launcher control to be displayed for launching a menu, wherein the menu includes a list of actions.

7. The method of claim 1, further comprising causing a menu launcher control to be displayed for launching a menu, wherein the menu includes a list of actions, and wherein at least one action includes a compare function.

8. The method of claim 1, further comprising causing a menu launcher control to be displayed for launching a menu, wherein the menu includes a list of actions, and wherein at least one action includes one or more of a promote function and a demote function.

9. The method of claim 1, further comprising causing a menu launcher control to be displayed for launching a menu, wherein the menu includes a list of actions, and wherein at least one action includes a delete function.

10. The method of claim 1, further comprising causing a menu launcher control to be displayed for launching a menu, wherein the menu includes a list of actions, and wherein at least one action includes a property modify function.

11. The method of claim 1, further comprising causing a menu launcher control to be displayed for launching a menu, wherein the menu includes a list of actions, and wherein an action selected from the menu is performed on all of the selected data items.

12. The method of claim 1, further comprising enabling a user to interact with one or more of the selected data items in the drawer window.

13. The method of claim 1, further comprising enabling a user to interact with all of the selected data items in the drawer window.

14. The method of claim 1, further comprising providing a data book marking function.

15. The method of claim 1, further comprising providing a data book marking function, wherein the data book marking function enables navigation back to particular data items in a hierarchical data model.

16. The method of claim 1, further comprising visually de-emphasizing the main window if the drawer window is smaller than the main window.

17. The method of claim 1, further comprising visually de-emphasizing the main window by decreasing contrast of colors of the main window if the drawer window is smaller than the main window.

18. The method of claim 1, further comprising visually de-emphasizing the main window by reducing saturation levels of colors of the main window if the drawer window is smaller than the main window.

19. A system for generating a tile visualization, the system comprising:
one or more processors; and
logic encoded in one or more non-transitory computer-readable media for execution by the one or more processors, and when executed operable to perform operations comprising:

retrieving hierarchical data from a data storage system, including one or more first data items and one or more second data items descended from at least one of the first data items;

generating for display a main window including at least a portion of the hierarchical data presented as a linear arrangement of icons in a container window disposed within the main window, wherein the container window includes a marker arrow pointing from an item located in an active item location of the container window to a panel portion of the main window containing descendants of the item;

enabling a user to select one or more of the first data items or the second data items;

generating for display a drawer window upon activation of a drawer function;

configuring the drawer window to visually emphasize selected data items outside of their hierarchical relationships;

configuring the main window to visually de-emphasize visible non-selected data items and windows disposed within the main window and disposed outside the drawer window; and causing the selected data items to be displayed in the drawer window.

20. A non-transitory computer-readable storage medium carrying program instructions thereon, the instructions when executed by one or more processors cause the one or more processors to perform operations comprising:

retrieving hierarchical data from a data storage system, including one or more first data items and one or more second data items descended from at least one of the first data items;

generating for display a main window including at least a portion of the hierarchical data presented as a linear arrangement of icons in a container window disposed within the main window, wherein the container window includes a marker arrow pointing from an item located in an active item location of the container window to a panel portion of the main window containing descendants of the item;

enabling a user to select one or more of the first data items or the second data items;

generating for display a drawer window upon activation of a drawer function;

configuring the drawer window to visually emphasize selected data items outside of their hierarchical relationships;

configuring the main window to visually de-emphasize visible non-selected data items and windows disposed within the main window and disposed outside the drawer window; and causing the selected data items to be displayed in the drawer window.

* * * * *